United States Patent
Dong

(10) Patent No.: US 9,115,729 B2
(45) Date of Patent: Aug. 25, 2015

(54) FLOATING ACTION TYPE SERVO-VALVE

(75) Inventor: Hua Dong, Hangzhou (CN)

(73) Assignee: HANGZHOU XZB TECH CO., LTD, Hangzhou, Zhejiang Province (CN)

( * ) Notice: Subject to any disclaimer, the term of this patent is extended or adjusted under 35 U.S.C. 154(b) by 288 days.

(21) Appl. No.: 13/824,207

(22) PCT Filed: May 3, 2012

(86) PCT No.: PCT/CN2012/075043
§ 371 (c)(1),
(2), (4) Date: Mar. 15, 2013

(87) PCT Pub. No.: WO2012/149902
PCT Pub. Date: Nov. 8, 2012

(65) Prior Publication Data
US 2013/0180606 A1    Jul. 18, 2013

(30) Foreign Application Priority Data

May 5, 2011    (CN) .......................... 2011 1 0115831

(51) Int. Cl.
| | |
|---|---|
| *F16K 11/074* | (2006.01) |
| *F16K 31/06* | (2006.01) |
| *F16K 31/124* | (2006.01) |
| *F15B 13/043* | (2006.01) |
| *F16K 31/10* | (2006.01) |

(52) U.S. Cl.
CPC ........... *F15B 13/043* (2013.01); *F16K 31/0682* (2013.01); *F16K 31/10* (2013.01)

(58) Field of Classification Search
CPC .... F15B 13/043; F16K 31/10; F16K 31/0682
USPC ........ 137/487.5, 625.21; 251/129.11, 129.19, 251/129.2
See application file for complete search history.

(56) References Cited

U.S. PATENT DOCUMENTS

| | | | | |
|---|---|---|---|---|
| 1,799,969 | A | * | 4/1931 | Goddard .................... 251/129.2 |
| 2,217,299 | A | * | 10/1940 | Taylor ........................ 244/134 A |
| 3,095,002 | A | * | 6/1963 | Healy ............................... 137/85 |
| 3,143,131 | A | * | 8/1964 | Spencer ......................... 137/269 |
| 3,587,645 | A | * | 6/1971 | Mengual .................. 137/625.21 |
| 4,058,288 | A | | 11/1977 | Carlson, Jr. |

(Continued)

FOREIGN PATENT DOCUMENTS

| | | |
|---|---|---|
| CN | 2597794 Y | 1/2004 |
| CN | 101430022 A | 5/2009 |

(Continued)

*Primary Examiner* — Marina Tiet Jen
*Assistant Examiner* — Seth W Mackay-Smith
(74) *Attorney, Agent, or Firm* — Jacobson Holman PLLC; Jiwen Chen

(57) ABSTRACT

The present invention relates to a valve, and a floating action type servo-valve used for fluid control, including a valve body, a torque motor, a pilot stage and a power stage control mechanism. An upper valve block, an intermediate block and a lower valve block are stacked and fastened by a fastener in the valve body. A torsion-bar spring of the torque motor passes through the center of an armature and is fixed to the valve body with a stand. A pilot stage revolving shaft and a power stage revolving stage are provided in a same central line, with a mating between the pilot stage revolving shaft and the upper valve block and a mating between the power stage revolving shaft and the lower valve block. The servo valve includes a shifting enlargement mechanism constitute by a shifting fork and a shifting lever.

13 Claims, 6 Drawing Sheets

(56) References Cited

U.S. PATENT DOCUMENTS

| | | | |
|---|---|---|---|
| 4,248,137 A * | 2/1981 | Caruso | 91/375 R |
| 4,345,228 A * | 8/1982 | Idogaki et al. | 335/222 |
| 2008/0202263 A1 | 8/2008 | Holtgraver | |
| 2011/0079297 A1 * | 4/2011 | Weixler et al. | 137/487.5 |

FOREIGN PATENT DOCUMENTS

| | | |
|---|---|---|
| CN | 201439843 U | 4/2010 |
| CN | 102146940 A | 8/2011 |
| CN | 202040140 U | 11/2011 |
| CN | 2559817 Y | 7/2013 |

* cited by examiner

FLOATING ACTION TYPE SERVO-VALVE

This is a U.S. national stage application of PCT Application No. PCT/CN2012/075043 under 35 U.S.C. 371, filed May 3, 2012 in Chinese, claiming the priority benefit of Chinese Application No. 201110115831.X, filed May 5, 2011, which is hereby incorporated by reference.

FIELD OF THE INVENTION

The present invention relates to a valve, and more specially relates to a floating action type servo-valve used for fluid control.

DESCRIPTION OF THE PRIOR ART

An electrically controlled fluid servo-valve is an automatically controlled valve with the purpose of amplifying low power electric signals to the output of high power fluid energy, thus realizing precise control over the physical parameters of position, speed and power of a load. In the automation industry requiring fast responsive speed, high precision and large output power, servo control systems are commonly used. As the kernel component of a servo control system, the servo valve performs a decisive role in the whole system. Therefore, the development of the high-performance servo-valve is of great importance to the development of automation industry.

A Chinese Patent No. ZL02252246.8 has disclosed a two-stage ring type servo valve that consists of an electrically-driven armature mechanism, a pilot stage fluid control mechanism and a power stage fluid control mechanism. The armature is connected with a screw to the pilot stage revolving shaft through the upper plate. A plate spring is provided between the armature and the stand mounted on the valve body. After a control current is inputted in the coil of the electrically-driven gag-bit mechanism, an electromagnetic torque drives the armature to overcome the elastic force of a plate spring and bring the pilot stage revolving shaft to rotate an angle θ in direct proportion to the electromagnetic torque, and meanwhile drives a pilot stage control loop to rotate an angle θ around the revolving shaft. Now two pilot stage control windows are opened simultaneously. One of the control windows communicates with a high pressure Ps to cause the high pressure Ps to enter the power stage piston cavity in communication with the control window. The other control window communicates with a regurgitant orifice T. The piston cavity in communication with the control window communicates with the regurgitant orifice T. Two power stage pistons are provided on the inner wall of the valve body. Under the pressure difference between two piston cavities, the power stage rotates with the pilot stage in the same direction. When having rotated a same angle θ, two pilot stage control windows are closed simultaneously, and the pressure of two power stage piston cavities is balanced and the two pistons stop rotating. Here two power stage control windows open a certain area that is in direct proportion to the rotation angle θ. Technically, this kind of servo valve has the following problems:

1. Restricted by the performance of magnetic material and required by linear electromagnetic output, the electrically-driven gag-bit mechanism provides a small rotation angle θ, so that the output flow of power stage is correspondingly restricted.

2. A rigid connection is used between the electrically-driven gag-bit mechanism and the pilot stage control mechanism. A deflecting force produced by assembly tolerance will apply to the pilot stage revolving shaft. As it is hard to be eliminated, the deflecting force will generate relatively large friction between the pilot revolving shaft and the revolving shaft hole of valve body, thus affecting performance parameters of the servo valve such as lag loop, sensitivity, null dead-zone and nonlinear error.

3. During the operation of the servo valve, the pilot stage revolving shaft under the return pressure in the valve cavity generates a propping-up force that will also generate relatively large friction to the pilot stage, thus affecting the dynamic and static performance of the servo valve.

4. Two power stage pistons are provided propping up in the cavity of valve body. Under the pressure, the pistons and the inner cavity wall of the valve body generate a fairly large friction, tending to cause power stage to move unsmoothly and inflexibly and affect the dynamic and static performance of the servo valve.

SUMMARY OF THE INVENTION

The object of this invention is to provide a floating action type servo-valve with more reasonable structure, adjustable output, less friction and better sensitivity.

To realize the above-mentioned object, the present invention adopts the following technical solution: a floating action type servo-valve comprises a valve body, a torque motor and a pilot stage control mechanism and a power stage control mechanism provided in a cavity of valve body, and an upper valve block, an intermediate block and a lower valve block stacked and fastened in the valve body through a fastener, wherein: the torsion-bar spring of the torque motor passes through the center of the armature and is fixed to the valve body with a supporting stand; the pilot stage revolving shaft and the power stage revolving stage are provided in a same central line, with a clearance fit between the pilot stage revolving shaft and the upper valve block and an interference fit or a clearance fit between the power stage revolving shaft and the lower valve block; the servo valve also comprises a shifting enlargement mechanism constitute by a shafting fork and a shafting lever, the rotation center of the shifting fork situating in the axis of the pilot stage revolving shaft and the rotation center of the shifting lever situating in the axis of a torsion-bar spring, one end of the shifting lever being connected to the lower end of torsion-bar spring of the torque motor and the other end of the shifting lever being slidably connected to the shifting fork wherein the connection between the shifting lever and the shifting fork can be a sliding drive mechanism of a point-contacting sphere and plane surface or a gear sliding drive mechanism of a linear-contacting cylinder and a plane surface.

The length L1 from the rotation center of the shifting lever to the contacting point and the length L2 from the rotation center of the shifting fork to the contacting point are adjustable. L1 can be more or less than or equal to L2.

The pilot stage control mechanism comprises a revolving shaft, a connecting rod and a control loop. The control loop comprises a main control loop, an outer loop and an inner loop. The revolving shaft is connected to the main control loop through the connecting rod. The periphery of the revolving shaft is provided with a ring channel. The revolving shaft is also provided with a through hole axially.

The power stage control mechanism comprises a revolving shaft, a connecting rod, a spool, a spool revolving shaft and a control loop. A clearance fit or interference fit is used between the revolving shaft and the revolving shaft hole of the connecting rod. A clearance fit is used between the spool and the spool hole of the connecting rod. The peripheries of the revolving shaft and the spool are provided with a ring channel. One end of spool revolving shaft and the ring channel in the middle section of the spool constitute a sliding drive mechanism, while the other end of spool shaft is fixedly connected to the valve body.

The pilot control loop consists of a main control loop, an outer loop and an inner loop. The axial end of the outer loop is provided with a notch symmetrical to its axis. The outer loop is pressed to fit the hole corresponding to the power stage connecting rod and the inner loop is pressed to fit the inner hole of the outer loop.

The pilot control loops comprise a main control loop, an upper outer loop, an upper inner loop, a lower outer loop and a lower inner loop. The main control loop is in an interference fit with the power stage connecting rod. The axial end the upper outer loop is provided with a notch symmetrical to its axis. The upper outer loop is pressed to fit the hole corresponding to the upper valve body and the upper inner loop is pressed to fit the inner hole of the upper outer loop. The axial end of the lower outer loop is provided with a notch symmetrical to its axis. The lower outer loop is pressed to fit the hole corresponding to lower valve body and the lower inner loop is pressed to fit the inner hole of the lower outer loop.

The valve body is also provided with an adapter plate beneath it and the adapter plate is fixedly connected to the lower valve block. The adapter plate is provided with an orifice that has an adjustable working position. So, it is suitable to multiple different device interfaces.

Compared to prior art, the servo valve of the present invention has the following advantages:

1. By adding a shifting enlargement mechanism, the present invention enlarges the rotation angle of torque motor and passes it to the revolving shaft of pilot stage with an enlargement factor L1/L2, thus significantly increasing power stage output. Of course, the enlargement factor of the shifting enlargement mechanism can be flexibly configured according to operation needs. By adjusting the lengths of L1 and L2, power stage flow can also be reduced.

2. Since the shifting lever and shifting fork use point-contacting or linear-contacting sliding connection, when the shifting enlargement mechanism butts the pilot stage, the torque motor will not generate a partial pressure on the pilot stage revolving shaft. Since the friction between the pilot stage revolving shaft and the revolving shaft hole of valve body is much less, the pilot stage control mechanism can move flexibly with better performance parameters of lag loop, sensitivity, null dead-zone and nonlinear error of the valve.

3. The pilot stage revolving shaft is provided with a through hole axially to balance the axial acting force of pressure of the regurgitant cavity on the pilot stage revolving shaft, thus reducing pilot stage friction and increasing flexibility of movement and the dynamic and static performances of the valve.

4. Certain working clearance is reserved for the end faces of both pilot stage and power stage control loops. During operation, the pilot stage and power stage control loops can suspend in the cavity of valve without direct mating with the inner wall of the valve body. The mechanism receives less friction and moves flexibly.

5. The spool and spool hole of power stage connecting rod are in a clearance fit. The spool is pressed by fluid axially. Balanced pressure at both ends eliminates the partial pressure on the spool revolving shaft. Therefore, the friction between spool and spool revolving shaft is less and the spool moves flexibly. The corresponding power stage receives less friction and moves flexibly.

6. The floating action type servo-valve of the present invention is provided with an adapter plate beneath the valve body. The adapter plate is provided with orifices whose working positions can be adjusted according to actual needs, thus meeting the requirements of different device interfaces.

7. The floating action type servo-valve of the present invention replaces the bending deformed spring used in the torque motor in traditional servo valve with the torsion deformed torsion-bar spring, prolonging the fatigue life of spring and correspondingly prolonging the service life of the valve.

Figure 1:
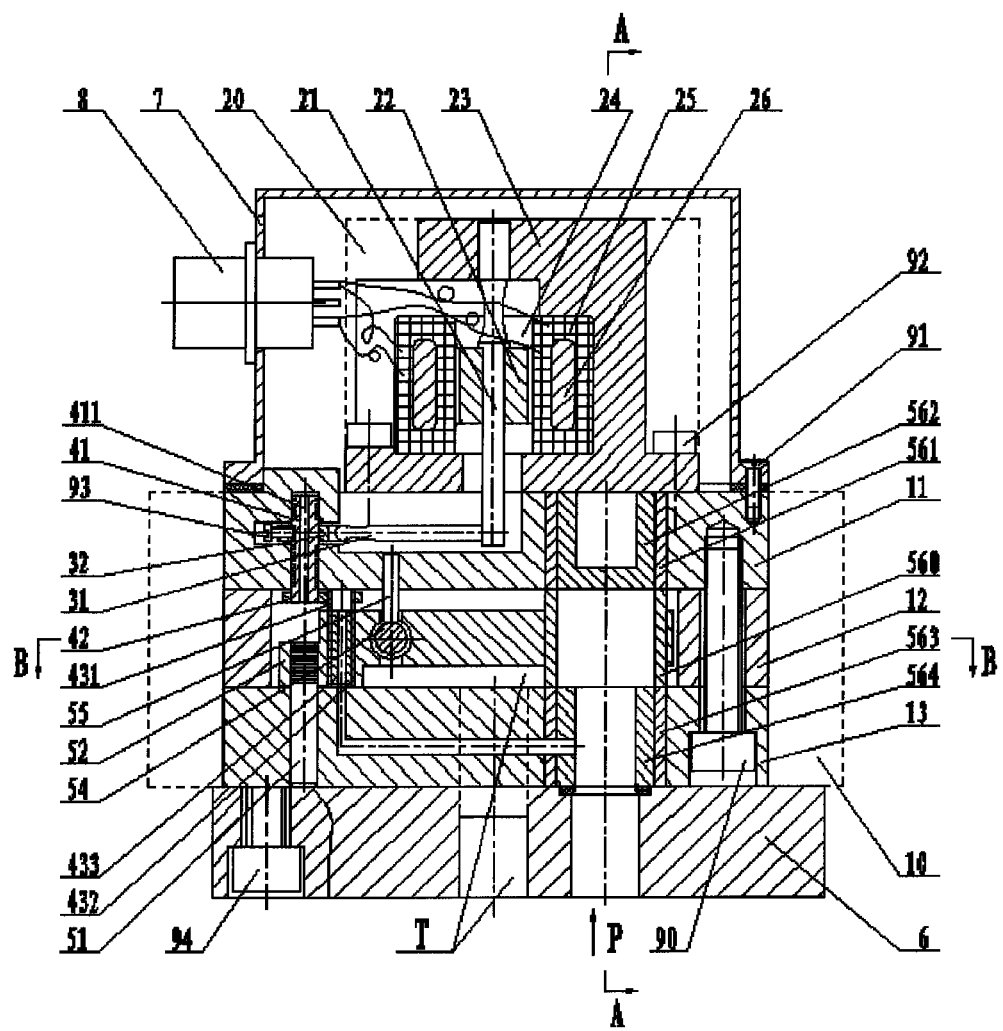
FIG. 1 is a schematic view of the first embodiment of the present invention.
Figure 2:
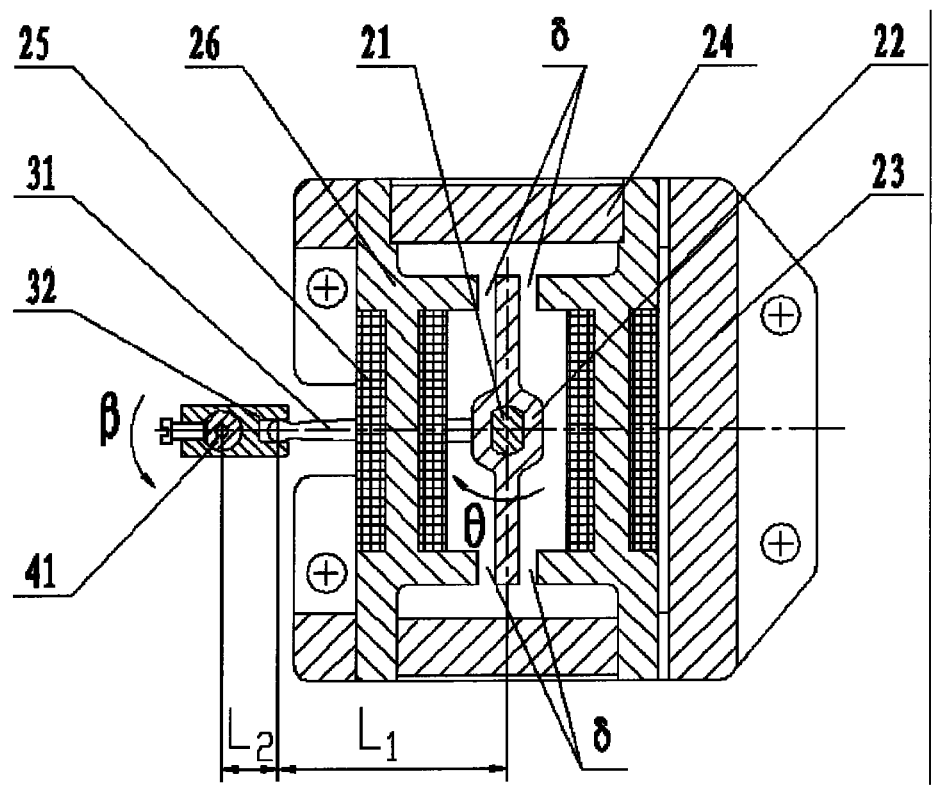
FIG. 2 is a schematic view of the torque motor butting pilot stage through the shifting enlargement mechanism.

In these figures: valve body 10, upper valve block 11, intermediate block 12, lower valve block 13, torque motor 20, torsion-bar spring 21, armature 22, stand 23, permanent magnet 24, coil 25, magnetizer 26, shifting lever 31, shifting fork 32, pilot stage revolving shaft 41, pilot stage connecting rod 42, pilot stage main control loop 431, pilot stage outer loop 432, pilot stage inner loop 433, power stage revolving shaft 51, power stage connecting rod 52, spool 54, spool revolving shaft 55, power stage main control loop 560, power stage upper outer loop 561, power stage upper inner loop 562, power stage lower outer loop 563, power stage lower inner loop 564, adapter plate 6, casing 7 and electric coupler 8.

DETAILED DESCRIPTION OF THE PREFERRED EMBODIMENTS

Reference will now be made in greater detail to exemplary embodiments of the invention with reference to the accompanying drawings:

As shown in FIG. 1 to FIG. 7, the floating action type servo-valve of the present invention mainly comprises a valve body 10, a torque motor 20 and a pilot stage control mechanism and a power stage control mechanism provided in the cavity of the valve body.

The valve body 10 comprises an upper valve block 11, an intermediate block 12 and a lower valve block 13 stacked and fastened by a screw 90. The upper and lower plane surfaces of the intermediate block 12 are in parallel. The intermediate block 12 is provided with two orifices A and B. The upper valve block 11 and the lower valve block 13 are provided with orifices corresponding to the above mentioned orifices A and B, respectively. The corresponding orifices in three members communicate respectively. The casing 7 is invertedly placed on the upper valve block 11 of the valve body 10 and is fastened by a screw 91.

The torque motor 20 is provided in the cavity defined by casing 7 and the valve body 10, comprising a pair of magnetizers 26, a pair of permanent magnets 24, an armature 22, a torsion-bar spring 21 and a stand 23. The stand 23 is fixed with the upper valve block 11 by a screw 92. The torsion-bar spring 21 is fixedly connected to the armature 22 through the center of the armature 22. The torsion-bar spring 21 is fixed to the valve body 10 through the connection with the stand 23. The middle part of the magnetizer 26 is wound by a coil 25 that is connected to the electric coupler 8 of the casing 7 by wires. The magnetizer 26 and the permanent magnet 24 are fixed on the stand 23 and are symmetrically distributed around the axis of the torsion-bar spring 21, respectively. The work surfaces of the armature 22 and magnetizer constitute four work magnetic gaps 6 with equal length (see FIG. 2).

The shifting enlargement mechanism consists of a shifting lever 31 and a shifting fork 32. The shifting lever 31 is connected to the lower end of the torsion-bar spring of the torque motor 20. The rotating center of the shifting lever is on the axis of the torsion-bar spring. The shifting fork 32 is fastened to the middle periphery of the pilot stage revolving shaft 41. The shifting lever 31 and shifting fork 32 are slidably connected. In their jointing interface, one end of the shifting lever takes a spherical form and the shifting fork takes a plane ⊏ form, constituting a zero-clearance sliding kinematic pair mating between the spherical surface and the plane surface. The shifting fork 32 is connected to the pilot stage revolving shaft 41 through the shifting fork. The rotating center of shifting fork is on the axis of pilot stage revolving shaft 41.

The pilot stage control mechanism comprises a revolving shaft 41, a connecting rod 42 and a control loop. The control loop consists of a main control loop 431, an outer loop 432 and an inner loop 433. The axis of control loop is parallel to the revolving shaft 41. The revolving shaft 41 is provided with a clearance fit with the rotated axle hole of the upper valve block 11. The revolving shaft 41 is axially provided with a through hole 411 and also axially provided with a ring channel in its periphery. The revolving shaft 41 is connected to the control loop with the connecting rod 42.

The power stage control mechanism comprises a revolving shaft 51, a connecting rod 52, a spool 54, a spool revolving shaft 55 and a control loop. The power stage revolving shaft 51 and the pilot stage revolving shaft 41 are provided in the same central line. The periphery of the revolving shaft 51 is provided with a ring channel in a clearance fit with the revolving shaft hole of the connecting rod 52. The lower end of revolving shaft 51 is in an interference fit with the revolving shaft hole of the lower valve block 13.

The axial end of the pilot stage outer loop 432 is provided with a notch symmetrical to its axis. The outer loop 432 is pressed to fit the inner hole of the outer loop 432 and form two windows A1 and A2 (see FIG. 7). There is a work clearance about 0.0005-0.003 mm between the lower interface of the pilot stage main control loop and the two windows A1 and A2.

The power stage control loops comprise a main control loop 560, an upper outer loop 561, an upper inner loop 562, a lower outer loop 563 and a lower inner loop 564. The main control loop 560 is in an interference fit with the power stage connecting rod 52. The axial end of the upper outer loop 561 is provided with a notch symmetrical to its axis. The upper outer loop 561 is pressed to fit a corresponding hole of upper valve body 11. The upper inner loop 562 is pressed to fit the inner hole of the upper outer loop 561 and form two windows C1, C2. The window C1 communicates with the orifice A, and the window C2 communicates with the orifice B. The axial end of the lower outer loop 563 is provided with a notch symmetrical to its axis. The lower outer loop 563 is pressed to fit the corresponding inner hole of the lower valve body 13. The lower inner loop 564 is pressed to fit the inner hole of the lower outer loop 563 and form two windows D1 and D2. The window D1 communicates with the orifice A and the window D2 communicates with the orifice B. There is a work clearance between the upper interface of the power stage main control loop and the windows C1 and C2 of the upper valve block 11. There is a work clearance between the lower interface of the power stage main control loop and the windows D1 and D2 of the lower valve block 13. The above mentioned work clearance is from 0.0005 mm to 0.003 mm.

The axis of the spool 54 and the windows A1, A2 are parallel to the plane surface of the axis of the main control loop 560. The periphery of the spool 54 is provided with a ring channel in clearance fit with the spool hole of the connecting rod 52. One end of the spool revolving shaft 55 is fixed on the valve body 10 and the other end and the ring channel in the middle part of the spool 54 constitute a zero-clearance sliding drive mechanism.

The spool cavity F1 communicates with the window A1, and the spool cavity F2 communicates with the window A2.

An adapter plate 6 is provided beneath the valve body and integrates with the lower valve block 13 through a screw 94. The adapter plate is provided with a high pressure orifice P, a regurgitant orifice T and orifices A and B. The high pressure orifice P communicates with the cavity of the pilot stage control loop and the cavity of the power stage control loop. The regurgitant orifice T communicates with the cavity of the valve body. The orifices A and B of the adapter plate communicate with the orifices A and B of the valve body, respectively. In addition, the positions of P, T, A, B of the adapter plate may be adjusted according to different devices to meet different types of interfaces.

Figure 3:
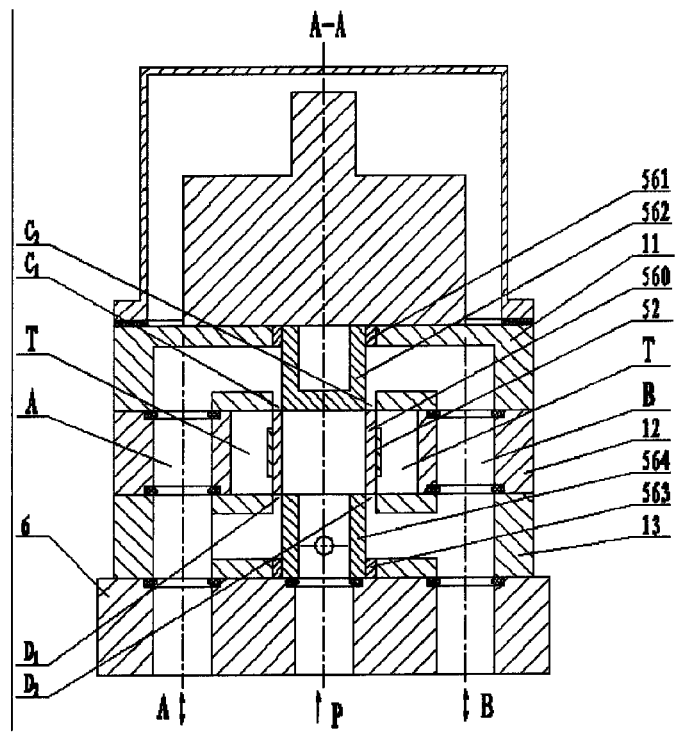
FIG. 3 is a sectional view of the power stage window along A-A line at zero position.
Figure 5:
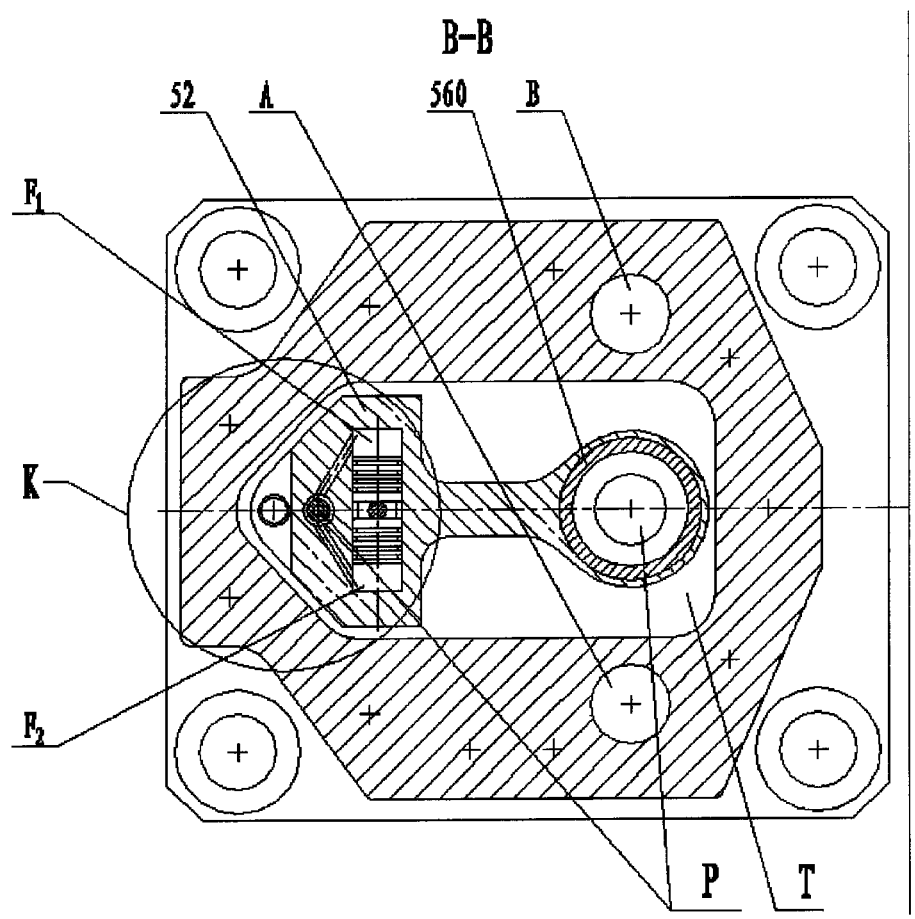
FIG. 5 is a sectional view along B-B line of FIG. 1.
Figure 6:
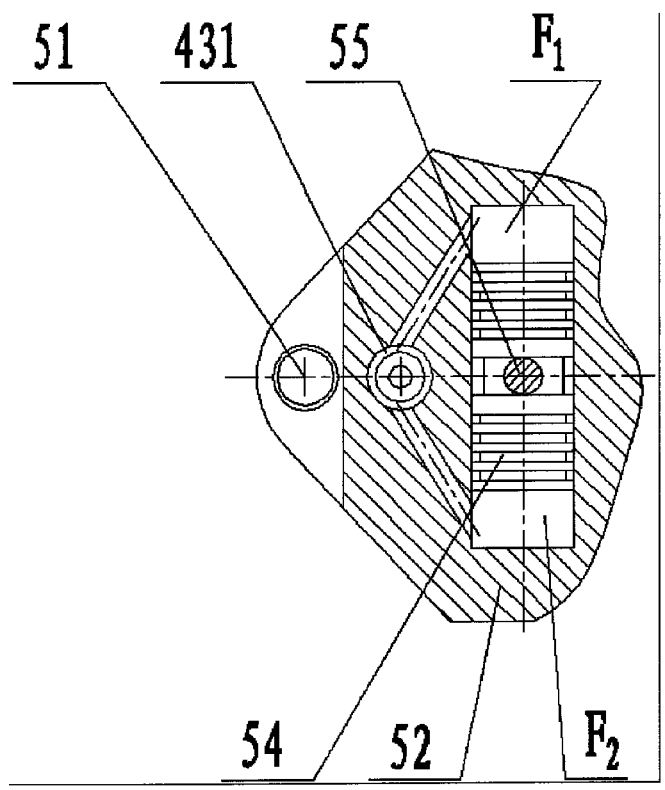
FIG. 6 is an enlarged view of part K of the pilot stage control loop at zero position in FIG. 5.

The operating principle of the present invention is as follows:

FIG. 3 is a sectional view of the power stage window along A-A line at zero position. When no signal current is inputted for the floating action type servo-valve of the present invention, the cavities of the pilot stage control loop and the power stage control loop communicate with the high pressure P. Now the state of S2 is: the pilot stage window A1 and A2 of S7 are in close state as shown in FIG. 5. The spool cavities F1 and F2 have a balanced pressure. The power stage window C1, C2, D1 and D2 are also in close state. The orifices A and B have no output.

Figure 4:
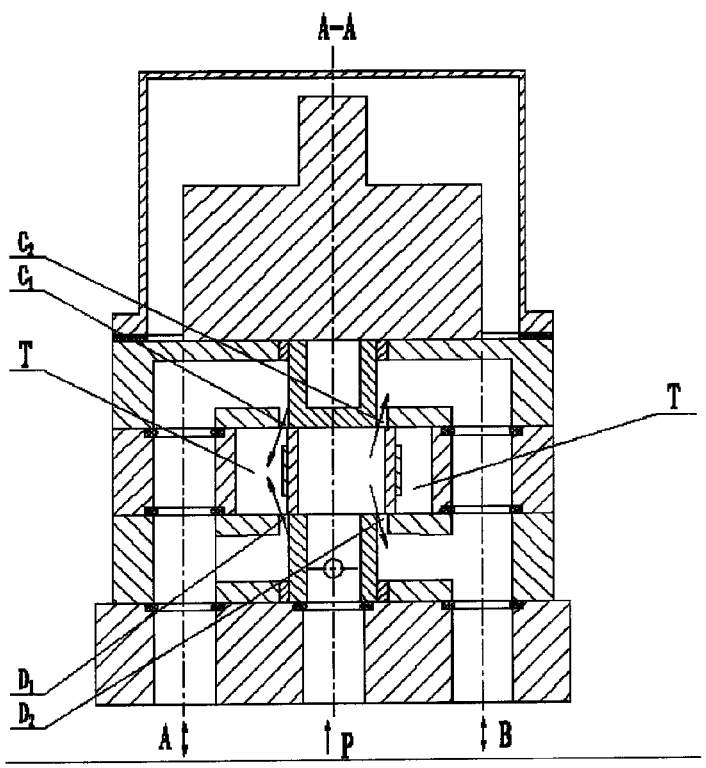
FIG. 4 is a sectional view of the opened power stage window along A-A line in working mode.

FIG. 4 is a sectional view of the opened power stage window along A-A line in working mode. When the coil 25 of the torque motor 20 inputs a control current, under the electromagnetic torque, the armature 22 overcomes the elastic force of the torsion-bar spring 21 and rotates an angle θ clockwise around the axis of the torsion-bar spring 21. The rotation angle θ is in direct proportional to control current. Since the pilot stage revolving shaft 41 drills through the shifting fork 32 and is connected with the shifting fork 32, and further by the shift enlargement of the shifting lever 31 and the shifting fork 32, enables the pilot stage revolving shaft 41 to drive the pilot stage control loop to rotate an angle β counterclockwise meeting the requirement of $$\beta = \frac{L_1}{L_2}\theta.$$

Apparently, when L1 is larger than L2, the rotation angle β is larger than the rotation angle θ. By controlling the size of L1 and L2, the correspondingly output to meet actual requirement can be obtained.

Figure 7:
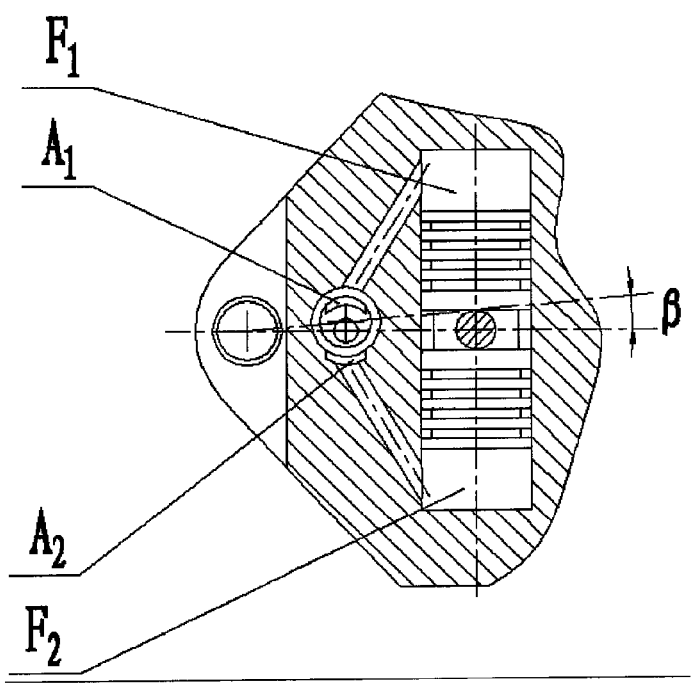
FIG. 7 is an enlarged view of part K of the pilot stage control loop at a rotary angle β.

Here, the pilot stage control loop rotates an angle β, and opens the control window A1 and A2 at the same time (as shown in FIG. 7). The high pressure P communicates with the spool cavity F1 through the window A1, and the spool cavity F2 communicates with the regurgitant orifice T through the window A2, forming a pressure difference between the spool cavity F1 and the spool cavity F2. Under the pressure difference, the power stage connecting rod 52 drives the power stage main control loop 560 to rotate counterclockwise around the power stage revolving shaft 51. When the main control loop 560 rotates to the angle β, the control windows A1 and A2 are closed at the same time. The pressures of the spool cavity F1 and spool cavity F2 are balanced, namely reaching a zero pressure difference, so that the main control loop 560 stops rotating. Here the windows C1, C2, D1 and D2 open a certain area that is direct proportional to the rotation angle β. The high pressure P communicates with the orifice B through the windows C1 and D1. The output of the orifice B is direct proportional to the opened area of the orifice C1, D1. Correspondingly, it is direct proportional to control current. The regurgitant orifice T communicates with the orifice A through the windows C2 and D2.

For the same reason, changing the polarity of a control current can realize the communication between the high pressure P and the orifice A as well as the communication between the regurgitant orifice T and the orifice B.

The above-mentioned is only an embodiment of the floating action type servo-valve of the present invention. The present invention can have multiple variations in structure such as two embodiments shown in FIG. 8 and FIG. 9, in which except the shifting enlargement mechanism, the structure of other parts of the servo-valve is the same as the first embodiment.

Figure 8:
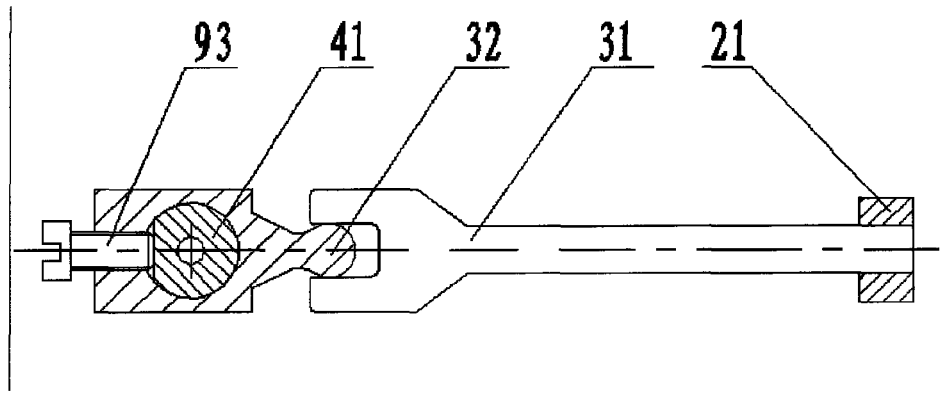
FIG. 8 is the second embodiment of the present invention.

As shown in FIG. 8, the shifting fork of the shifting enlargement mechanism is a sphere, and the shifting lever is a ⊐-form plane surface, thus constituting a sliding drive mechanism of a point-contacting sphere and a plane surface.

Figure 9:
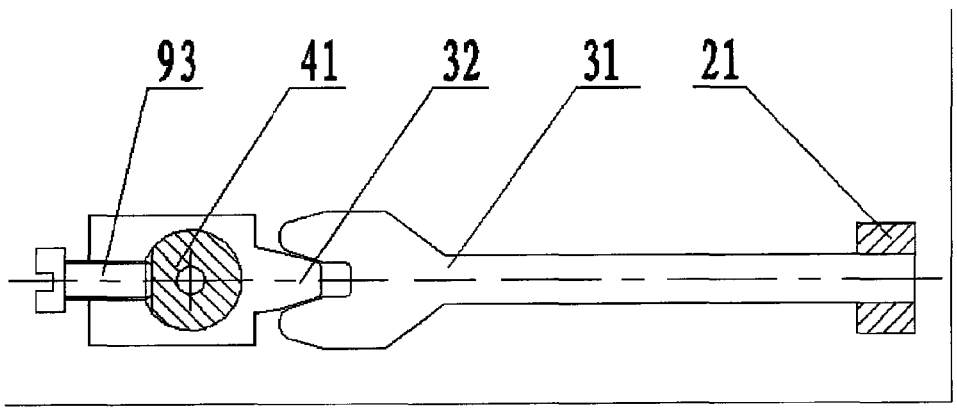
FIG. 9 is the thirdly embodiment of the present invention.

As shown in FIG. 9, the shifting lever and the fork of shifting enlargement mechanism are gear involute toothing, constituting a lineal contact gear sliding drive mechanism.

It can be reasonably understood that the floating action type servo-valve of the present invention is not limited to the specific structure of the above-mentioned embodiment. Those skilled in the art will appreciate that various modifications, additions and substitutions are possible, without departing from the scope and spirit of the invention.

The invention claimed is:

1. A floating action type servo-valve, comprising a valve body, a torque motor, and a pilot stage control mechanism and a power stage control mechanism provided in a cavity of the valve body, and an upper valve block, an intermediate block, a valve block stacked and fastened by a fastener in the valve body, wherein:
    a torsion-bar spring of the torque motor passes through a center of an armature and fixed to the valve body with a supporting stand;
    a pilot stage revolving shaft and a power stage revolving shaft have a common axial, with a clearance fit between the pilot stage revolving shaft and the upper valve block and an interference fit or a clearance fit between the power stage revolving shaft and the lower valve block;
    the servo valve also comprises a shifting enlargement mechanism constituted by a shifting fork and a shifting lever, a rotation center of the shifting fork situating in an axis of the pilot stage revolving shaft and a rotation center of the shifting lever situating in an axis of the torsion-bar spring, one end of the shifting lever being connected to a lower end of the torsion-bar spring of the torque motor and the other end of the shifting lever being slidably connected to the shifting fork.

2. The floating action type servo-valve according to claim 1, wherein the shifting lever and the shifting fork adopt a sliding drive mechanism of a sphere and a plane surface, or a sliding drive mechanism of a cylinder and a plane surface, or a gear sliding drive mechanism.

3. The floating action type servo-valve according to claim 2, wherein a length L1 from the rotation center of the shifting lever to a contacting point is more or less than a length L2 from the rotation center of the shifting fork to a contacting point.

4. The floating action type servo-valve according to claim 1, wherein a length L1 from the rotation center of the shifting lever to a contacting point is more or less than a length L2 from the rotation center of the shifting fork to a contacting point.

5. The floating action type servo-valve according to claim 1, wherein the pilot stage control mechanism comprises a revolving shaft, a connecting rod and a control loop consisting of a main control loop, an inner loop and an outer loop, the revolving shaft being connected to the main control loop through the connecting rod and a periphery of the revolving shaft being provided with a ring channel.

6. The floating action type servo-valve according to claim 4, wherein the control loop comprises a main control loop, an outer loop and an inner loop, one of the outer loop being provided with a notch symmetrical to its axis, the outer loop being pressed to fit a hole corresponding to the power stage connecting rod and the inner loop being pressed to fit an inner hole of the outer loop.

7. The floating action type servo-valve according to claim 5, wherein the pilot stage revolving shaft is provided with a through hole axially.

8. The floating action type servo-valve according to claim 1, wherein the power stage control mechanism comprises a revolving shaft, a connecting rod, a spool, a spool revolving shaft and a control loop, a clearance fit or an interference fit being used between the revolving shaft and the revolving shaft hole of the connecting rod, a periphery of revolving shaft being provided with a ring channel, a clearance fit being used between the spool and the spool hole of the connecting rod, a periphery of spool being provided with a ring channel, one end of spool revolving shaft being fixedly connected to the valve body and the other end and the ring channel of spool constituting a sliding drive mechanism.

9. The floating action type servo-valve according to claim 8, wherein the power stage control loop comprises a main control loop, an upper outer loop, an upper inner loop, a lower out loop and a lower inner loop, the main control loop being in an interference fit with the power stage connecting rod, one of the upper outer loop being provided with a notch symmetrical to its axis, the upper outer loop being pressed to fit a hole corresponding to the upper valve body and the upper inner loop being pressed to fit an inner hole of the upper outer loop, one end of the lower outer loop being provided with a notch symmetrical its axis, the lower outer loop being pressed to fit a hole corresponding to the lower valve body and the lower inner loop being pressed to fit an inner hole of the lower outer loop.

10. The floating action type servo-valve according to claim 1, wherein the control loop comprises a main control loop, an outer loop and an inner loop, one of the outer loop being provided with a notch symmetrical to its axis, the outer loop being pressed to fit a hole corresponding to the power stage connecting rod and the inner loop being pressed to fit an inner hole of the outer loop.

11. The floating action type servo-valve according to claim 1, wherein the power stage control loop comprises a main control loop, an upper outer loop, an upper inner loop, a lower out loop and a lower inner loop, the main control loop being in an interference fit with the power stage connecting rod, one of the upper outer loop being provided with a notch symmetrical to its axis, the upper outer loop being pressed to fit a hole corresponding to the upper valve body and the upper inner loop being pressed to fit an inner hole of the upper outer loop, one end of the lower outer loop being provided with a notch symmetrical its axis, the lower outer loop being pressed to fit a hole corresponding to the lower valve body and the lower inner loop being pressed to fit an inner hole of the lower outer loop.

12. The floating action type servo-valve according to claim 1, wherein the pilot stage revolving shaft is provided with a through hole axially.

13. The floating action type servo-valve according to claim 1, wherein the valve body is provided with an adapter plate beneath the valve body Viand the adapter plate is fixedly connected to the lower valve block and provided with an orifice on the adapter plate.

* * * * *